US011951506B2

(12) United States Patent
Gross et al.

(10) Patent No.: US 11,951,506 B2
(45) Date of Patent: Apr. 9, 2024

(54) TWO PART APPLICATOR PEN

(71) Applicant: Hamilton Sundstrand Corporation, Charlotte, NC (US)

(72) Inventors: Brodie Gross, Janesville, WI (US); Cody Coogan, Columbiana, AL (US); Blair A. Smith, South Windsor, CT (US); Kevin R. Bordage, Westfield, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 7 days.

(21) Appl. No.: 17/940,596

(22) Filed: Sep. 8, 2022

(65) Prior Publication Data

US 2024/0082872 A1 Mar. 14, 2024

(51) Int. Cl.

*B05C 11/10* (2006.01)
*B05C 1/00* (2006.01)
*B05C 17/005* (2006.01)
*C23C 22/83* (2006.01)

(52) U.S. Cl.

CPC ............ *B05C 11/1036* (2013.01); *B05C 1/00* (2013.01); *B05C 17/00576* (2013.01); *C23C 22/83* (2013.01); *B05C 17/00553* (2013.01); *B05C 17/00556* (2013.01); *B05C 17/00583* (2013.01)

(58) Field of Classification Search

CPC ..... C23C 22/83; C23C 22/82; B05C 11/1036; B05C 1/00; B05C 17/00576; B05C 17/00583; B05C 17/00593; B05C 17/00553; B05C 17/01; B05C 17/00556; B65D 35/242; B65D 35/22; A61M 35/006

USPC .... 401/44–47, 176, 179, 184–186, 132, 133

See application file for complete search history.

(56) References Cited

U.S. PATENT DOCUMENTS

| | | | | |
|---|---|---|---|---|
| 4,801,008 | A | 1/1989 | Rich | |
| 7,001,091 | B1 | 2/2006 | Knight | |
| 9,826,815 | B2 | 11/2017 | Pires et al. | |
| 2017/0327955 | A1 | 11/2017 | Smith et al. | |
| 2021/0285121 | A1 * | 9/2021 | Flegny | C25D 11/246 |

* cited by examiner

*Primary Examiner* — David J Walczak

(74) *Attorney, Agent, or Firm* — Kinney & Lange, P.A.

(57) ABSTRACT

A handheld applicator for delivery of post-treatment coating following application of a conversion coating includes a first vessel extending longitudinally and containing SOCOSURF PACS™ solution, a second vessel extending longitudinally and containing hydrogen peroxide, a pH indicator contained in one of the first or second vessels, a mixing region configured to combine the SOCOSURF PACS™ solution, hydrogen peroxide, and pH indicator.

17 Claims, 3 Drawing Sheets

TWO PART APPLICATOR PEN

BACKGROUND

The present disclosure is directed generally to application of barrier coatings for metal substrates and, more particularly, to non-hexavalent chromium chemical conversion coatings (CCCs) and post-treatment thereof.

Aluminum and aluminum alloy components used in aeronautics and aerospace applications are subjected to environments that cause corrosion. MIL-DTL-81706 Type II CCCs are used to form a corrosion-resistant protective barrier coating by reaction with the surface of aluminum and aluminum alloy substrates. Type II refers to compositions containing no hexavalent chromium, which has been banned in many countries. Repair of these barrier coatings is often required over the operational life of a component. On-wing repair is preferred but has associated challenges related to spatial constraints and the orientation of surfaces requiring repair. For example, surfaces that allow for solution dripping can pose environmental and operator hazards. Typically, Type II CCCs must remain in contact with a surface for up to 20 minutes to react. Touch-ups of CCCs can be applied by applicator pens, which minimize solution dripping and operator exposure. However, there remains a need for providing post-treatment, such as SOCOSURF PACS™ solution used to reinforce the CCC, for which no applicator pen exists.

The handling and preparation of SOCOSURF PACS™ solution for application to a surface present challenges. The current process requires mixing the SOCOSURF PACS™ solution with hydrogen peroxide, testing the pH of the mixture, and applying the mixture to a substrate via immersion. The mixture of SOCOSURF PACS™ and hydrogen peroxide does not have a stable shelf life and, therefore, is generally mixed at the time of application and used within a short time span (e.g., one to two days).

A need exists for improved CCC post-treatment application means facilitating a stable shelf life.

SUMMARY

A handheld applicator for delivery of post-treatment coating following application of a conversion coating includes a first vessel extending longitudinally and containing SOCOSURF PACS™ solution, a second vessel extending longitudinally and containing hydrogen peroxide, a pH indicator contained in one of the first or second vessels, a mixing region configured to combine the SOCOSURF PACS™ solution, hydrogen peroxide, and pH indicator.

The present summary is provided only by way of example, and not limitation. Other aspects of the present disclosure will be appreciated in view of the entirety of the present disclosure, including the entire text, claims and accompanying figures.

Figure 2:
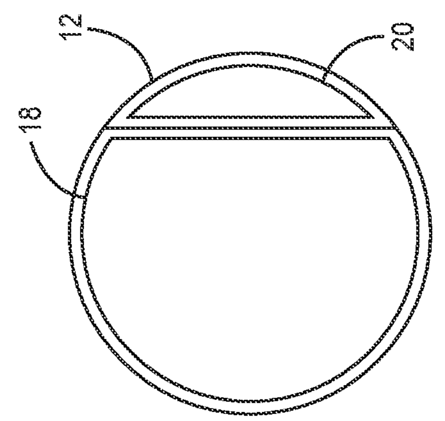
FIG. 2 is a cross-sectional view of the two-part applicator pen of FIG. 1 taken along section line 2-2 of FIG. 1.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to two-part applicator pens configured to separately store SOCOSURF PACS™ solution and hydrogen peroxide and provide controlled mixing of the two chemical components at proper ratios when ready for use. The mixture can be used for on-wing post-treatment of a non-hexavalent chromium chemical conversion coating (CCC), which oxidizes trivalent chromium on the surface, making the trivalent chromium coating more corrosion resistant, and fills the porosity created by the trivalent chromium solution. Use of the disclosed two-part applicator pens minimizes solution dripping and operator exposure as well other as environmental health and safety hazards. A pH indicator material incorporated into the mixture allows a user to monitor the shelf life of the mixture and confirm that the mixture has an acceptable chemical composition for use. Separate storage of the SOCOSURF PACS™ solution and hydrogen peroxide provides a stable shelf life. Multiple embodiments of the two-part applicator pen are disclosed herein.

Figure 1:
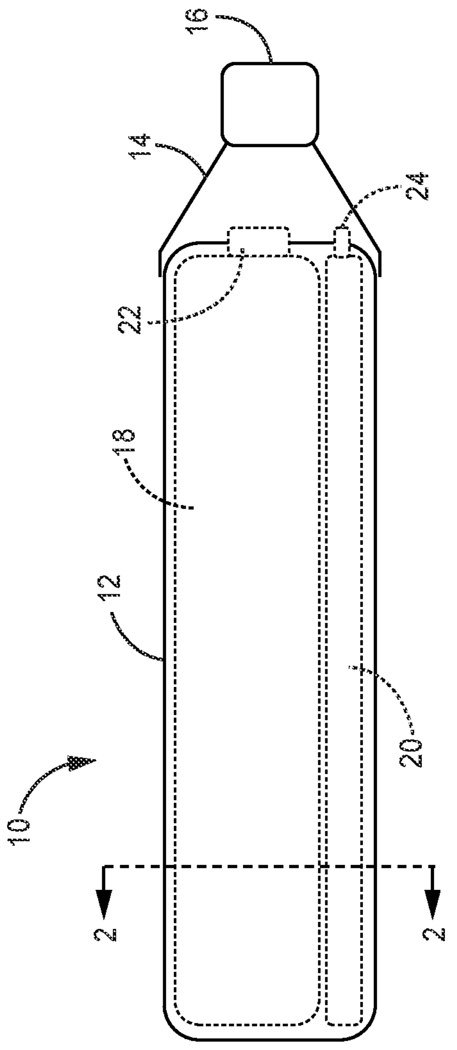
FIG. 1 is an isometric view of a two-part applicator pen for delivery of a post-treatment solution following application of a non-hexavalent chromium chemical conversion coating (CCC).

FIG. 1 is an isometric view of applicator pen 10 for delivery of a post-treatment solution following application of a non-hexavalent chromium CCC. FIG. 2 is a cross-sectional view of applicator pen 10 of FIG. 1 taken along section line 2-2 of FIG. 1. FIGS. 1 and 2 are discussed together. Outer vessel 12, mixing vessel 14, applicator tip 16, fluid vessels 18 and 20, and valves 22 and 24 are shown.

Applicator pen 10 is a handheld two-part applicator pen configured to be actuated for use by squeezing outer vessel 12 to deliver contents of fluid vessels 18 and 20 into mixing vessel 14 and to applicator tip 16. Outer vessel 12 is configured to receive fluid vessels 18 and 20. Outer vessel 12 extends longitudinally between oppositely disposed ends. Outer vessel 12 can be a cylindrical housing having a circular cross-sectional shape. One or both ends of outer vessel 12 can be configured to open to receive fluid vessels 18 and 20. Outer vessel 12 connects to mixing vessel 14 at one end. Outer vessel 12 can be connected to mixing vessel 14, for example, by a threaded connection with a sealing member (not shown) to prevent fluid leakage. Outer vessel 12 is formed of a flexible material capable of nondestructively bending or deflecting when squeezed to apply force to fluid vessels 18 and 20 and actuate valves 22 and 24. For example, outer vessel 12 can be formed of a squeezable plastic material. Outer vessel 12 can be formed of a material capable of returning to an original shape following squeezing to allow for reuse of outer vessel 12 with replacement fluid vessels 18 and 20.

Fluid vessels 18 and 20 (shown in phantom) extend longitudinally between oppositely disposed ends and are arranged in a side-by-side orientation. Fluid vessel 18 includes valve 22 at one end. The opposite end of fluid vessel 18 is closed. Fluid vessel 20 includes valve 24 at one end. The opposite end of fluid vessel 20 is closed. Valves 22 and 24 are one-way valves configured to permit fluid flow out of fluid vessels 18 and 20 into mixing vessel 14 and to prevent backflow of fluid into fluid vessels 18 and 20. Fluid vessels 18 and 20, including valves 22 and 24, can be configured as replaceable cartridges. Fluid vessel 18 contains SOCOSURF PACS™ SOCOSURF PACS™ is a lanthanum (III) salt solution (i.e., solution of greater than or equal to 1% and less than 3% lanthanum nitrate hexahydrate) used to reinforce non-hexavalent chromium CCC. Fluid vessel 20 contains hydrogen peroxide and a pH indicator. Fluid vessel 20 can additionally include ammonium hydroxide to set a pH. In alternative embodiments, the pH indicator can be provided in the SOCOSURF PACS™ solution in fluid vessel 18. Fluid vessels 18 and 20 can be stored in outer vessel 12 or inserted into outer vessel 12 at the time of use. Fluid vessel 18 can be formed of a chemically resistant material configured for long-term storage of the SOCOSURF PACS™ solution, such as polyvinyl chloride (PVC), polyvinylidene chloride (PVDC), polypropylene (PP), polyvinylidene fluoride (PVF), polytetrafluoroethylene (PTFE), low density polyethylene (LDPE), high density polyethylene (HDPE) among others, to provide a stable shelf life. Fluid vessel 20 can be formed of a material configured for long-term storage of hydrogen peroxide, such as light-resistant plastic as known in the art to provide a stable shelf-life. In some examples, fluid vessel 20 can be formed of PVC, PVDC, PVF, PTFE, ABS plastic, polycarbonate and various elastomeric materials such as fluoroelastomers like Viton or Viton A. Fluid vessels 18 and 20 are formed of flexible materials, capable of being squeezed to exert a force on contents therewithin and actuate valves 22 and 24.

The volume fluid vessels 18 and 20 can differ as appropriate to contain the proper mixing ratio of the SOCOSURF PACS™ solution to hydrogen peroxide. As illustrated in FIGS. 1 and 2, fluid vessel 18, containing the SOCOSURF PACS™ solution, has a greater volume than fluid vessel 20, containing hydrogen peroxide. The volume ratio of fluid vessel 18 to fluid vessel 20 can be, for example, approximately 13 or up to approximately 16. Specifically, the volume ratio of fluid vessel 18 to fluid vessel 20 can be 93:7 to 94:6. For example, in a 100 mL applicator pen, fluid vessel 18 can be configured to contain approximately 93-94 mL of SOCOSURF PACS™ solution and fluid vessel 20 can be configured to contain approximately 6-7 mL of hydrogen peroxide plus pH indicator and ammonium hydroxide drops.

Valves 22 and 24 can be, for example, spring type check valves as known in the art to allow fluid flow in a single direction to mixing vessel 14 when pressure is exerted by on valves 22 and 24 by fluids contained in fluid vessels 18 and 20 and to stop fluid flow and close the opening to fluid vessels 18 and 20 when the applied pressure is removed. Valves 22 and 24 have different geometries or different cross-sectional opening sizes designed to provide the proper mixing ratio of the SOCOSURF PACS™ solution to hydrogen peroxide to mixing vessel 14. Valves 22 and 24 are selected to permit flow of the contents of fluid vessels 18 and 20 at rates required to meet the desired mixing ratio. For example, valve 22 of fluid vessel 18 can have an opening diameter greater than an opening diameter of valve 24 of fluid vessel 20 to deliver more of the SOCOSURF PACS™ solution than hydrogen peroxide to mixing vessel 14 per unit time. Specifically, valves 22 and 24 can be sized to deliver a ratio of the PACS solution to hydrogen peroxide of approximately 13 or up to approximately 16, or specifically, around 93:7 to 94:6. During application, a user squeezes outer vessel 12 and thereby fluid vessels 18 and 20 to cause fluid flow out of fluid vessels 18 and 20 through valves 22 and 24, respectively, into mixing vessel 14. The volume of fluid delivered from each of vessels 18 and 20 per unit time differs based on the size of valves 22 and 24.

Figure 4:
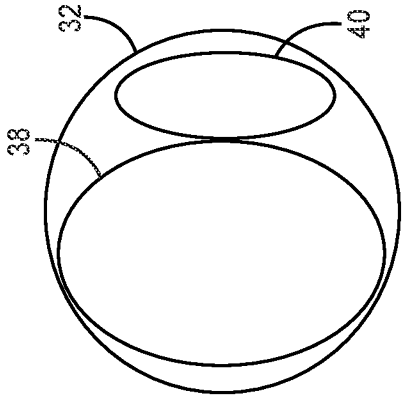
FIG. 4 is a cross-sectional view of the two-part applicator pen of FIG. 3 taken along section line 4-4 of FIG. 3.

Fluid vessels 18 and 20 can have any shape suitable for storing and delivering fluids. As illustrated in FIG. 2, fluid vessels 18 and 20 can have semi-circular cross-sectional shapes with a combination of curved and straight walls to substantially fill a space provided by outer vessel 12. In other embodiments, fluid vessels 18 and 20 can have circular or oval cross-sectional shapes (e.g., as illustrated in FIG. 4).

Mixing vessel 14 is connected to outer vessel 12 and is configured for fluid communication with fluid vessels 18 and 20 when valves 22 and 24 are open. Mixing vessel 14 provides a mixing region for the contents of fluid vessels 18 and 20 (i.e., the SOCOSURF PACS™ solution, hydrogen peroxide, pH indicator, and ammonium hydroxide). Mixing vessel 14 is sized to accommodate a portion of the contents of fluid vessels 18 and 20. Mixing vessel 14 can be refilled as needed during application. Mixing vessel 14 is formed of a material that allows a user to visually identify a color of the mixture of the contents received from fluid vessels 18 and 20. For example, mixing vessel 14 can be glass, a translucent plastic material, clear PVC, or clear PVDC. Mixing vessel 14 is not intended to provide long-term storage of the mixture of fluids received from fluid vessels 18 and 20 and, therefore, does not need to provide long-term chemical stability. Mixing vessel 14 is configured to be replaceable and/or recyclable (i.e., cleaned) for reuse in later applications. Although mixing vessel 14 is illustrated as being secured to an outer surface of outer vessel 12, other arrangements are contemplated and fall within the scope of the present disclosure.

During application, mixing vessel 14 is filled or partially filled with the contents of fluid vessels 18 and 20, including the SOCOSURF PACS™ solution, hydrogen peroxide, pH indicator, and ammonium hydroxide. Mixing can occur upon delivery of the fluids to mixing vessel 14 and should not require further agitation (e.g., shaking) although gentle shaking or rocking can be provided to ensure proper mixing. The presence of the pH indicator allows the user to confirm that the constituents of fluid vessels 18 and 20 have been properly stored or that the mixture has a proper chemical composition for use. An acceptable pH of the mixture is in the range of 4.2 to 5.3. The pH indicator (i.e., color of the mixture) is visible through the walls of mixing vessel 14. Any one or combination of pH indicators can be provided to determine if the pH of the mixture is within the acceptable range. The pH indicator can be selected to provide a visible color indicating a pH equal to or greater than 4.2 and equal to or less than 5.3. Alternatively, the pH indicator can be selected to provide a visible color indicating a pH less than 4.2 or greater than 5.3. For example, one or a combination of pH indicators such as Methyl Red, Congo Red, Methyl Orange, Bromocresol Green, Bromocresol Purple, Bromophenol Blue, etc. could be used to determine the pH of the mixture. If the pH falls outside of the acceptable range, the user will recognize the need to replace one or both fluid vessels 18 and 20. Hydrogen peroxide can have a shorter shelf life than the SOCOSURF PACS™ solution. As such, a user may only need to replace fluid vessel 20.

Applicator tip 16 is in fluid communication with mixing vessel 14 and configured to deliver the mixture of the contents of mixing vessel 14 (i.e., the SOCOSURF PACS™ solution, hydrogen peroxide, pH indicator, and ammonium hydroxide) to a substrate to be protected. Applicator tip can be a porous material configured to transfer the liquid from mixing vessel 14 to the substrate in contact with applicator tip 16. Applicator tip can be, for example, a porous pad as known in the art. In alternative embodiments, applicator tip can be a brush, roller, or other suitable device known for controlled delivery of a liquid to a surface. A portion (not shown) of applicator tip 16 can extend into mixing vessel 14. Applicator tip 16 can be fixed to mixing vessel 14 or can be separable from mixing vessel 14. Applicator tip can be replaceable with mixing vessel 14 or replaceable independent of mixing vessel 14 between applications.

Figure 3:
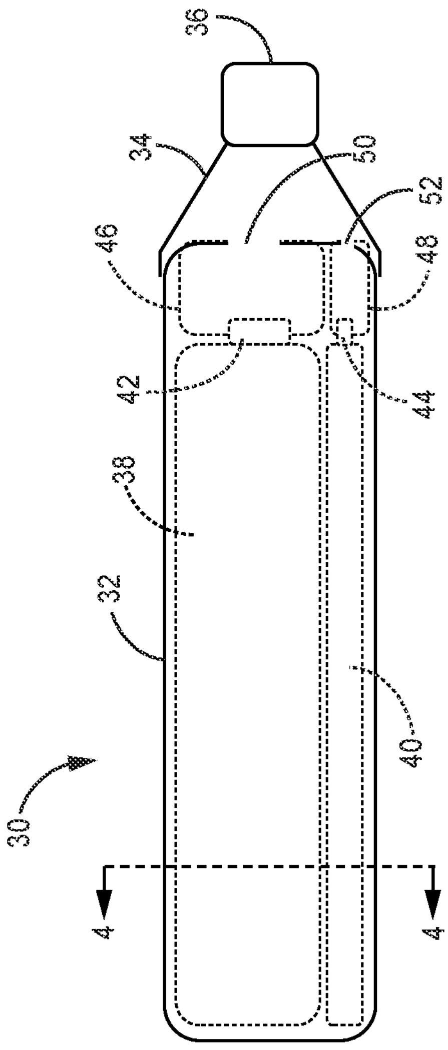
FIG. 3 is an isometric view of another example of a two-part applicator pen for delivery of a post-treatment solution following application of a non-hexavalent chromium chemical conversion coating (CCC).

FIG. 3 is an isometric view of applicator pen 30 for delivery of a post-treatment solution following application of a non-hexavalent chromium CCC. FIG. 4 is a cross-sectional view of applicator pen 30 of FIG. 3 taken along the 4-4 line. FIGS. 3 and 4 are discussed together. Outer vessel 32, mixing vessel 34, applicator tip 36, fluid vessels 38 and 40, valves 42 and 44, storage vessels 46 and 48, and openings 50 and 52 are shown. Applicator pen 30 is substantially the same as applicator pen 10 with the addition of storage vessels 46 and 48 and openings 50 and 52 and the modified cross-sectional shape of fluid vessels 38 and 40. In other embodiments, the cross-sectional shape of fluid vessels 38 and 40 can substantially match the cross-sectional shape of fluid vessels 18 and 20. Outer vessel 32, mixing vessel 34, applicator tip 36, and valves 42 and 44 are substantially the same as outer vessel 12, mixing vessel 14, applicator tip 16, and valves 22 and 24, respectively, illustrated in FIG. 1 and described with respect thereto. As such, only modifications of applicator pen 30 relative to applicator pen 10 are discussed herein—specifically, the addition of storage vessels 46 and 48 and openings 50 and 52.

Storage vessels 46 and 48 are provided to contain a volume of each of the SOCOSURF PACS™ solution and hydrogen peroxide in the proper ratio before delivery to mixing vessel 14. Valves 42 and 44 are connected to storage vessels 46 and 48 (instead of mixing vessel 14 as provided in applicator pen 10). Storage vessel 46 has a volume greater than a volume of storage vessel 48. As previously discussed with respect to applicator pen 10, a proper volume ratio of the SOCOSURF PACS™ solution to hydrogen peroxide can approximately 13 or up to approximately 16, and specifically, around 93:7 to 94:6. During application, a user can hold applicator pen 30 with applicator tip 36 pointing upward and squeeze outer vessel 32 to fill storage vessels 46 and 48. Once storage vessels 46 and 48 are filled, applicator pen 30 can be positioned with applicator tip 36 pointing downward to allow the contents of storage vessels 46 and 48 to drain into mixing vessel 34 via gravity.

Openings 50 and 52 are disposed at ends of storage vessels 46 and 48, respectively, to allow unimpeded flow from storage vessels 46 and 48 into mixing vessel 34. Openings 50 and 52 can be sized to allow the contents of storage vessels 46 and 48 to flow into mixing vessel 34 at proportional rates, such that storage vessels 46 and 48 are fully emptied (less residual fluid held to vessel walls by surface tension or trapped adjacent to openings 50 and 52) at the same time.

Storage vessels 46 and 48 can be cartridges assembled with fluid vessels 38 and 40, or, alternatively, with outer vessel 32 or mixing vessel 34.

Applicator pens 10 and 30 can be reused for multiple applications over an extended period of time. Valves 22 and 24 and 42 and 44 can prevent contamination of fluid vessels 18 and 20 and 38 and 40, respectively, such that unused portions of fluid vessels 18 and 20 and 38 and 40 can be stored for later use. Mixing vessels 14 and 34 and applicator tips 16 and 36 can be replaced or cleaned and reused for later applications. One or more fluid vessels 18, 20, 38, and 40 can be replaced at any time independent of the accompanying fluid vessel 18, 20, 38, and 40. Applicator pens 10 and 30 can be sized for handheld use (e.g., diameter of approximately 20 mm or less for ease of use).

Figure 5:
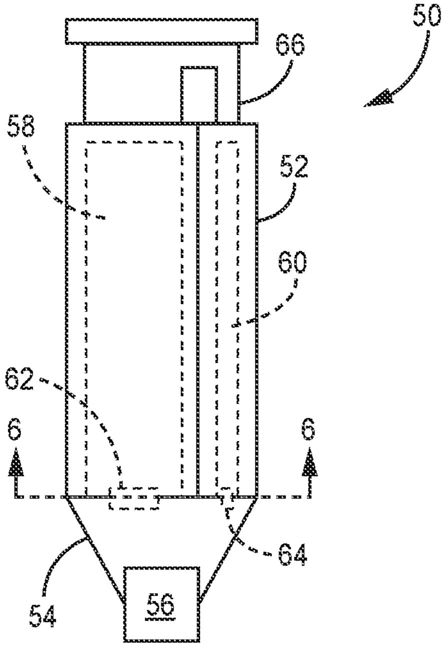
FIG. 5 is an isometric view of yet another example of a two-part applicator pen for delivery of a post-treatment solution following application of a non-hexavalent chromium chemical conversion coating (CCC).
Figure 6:
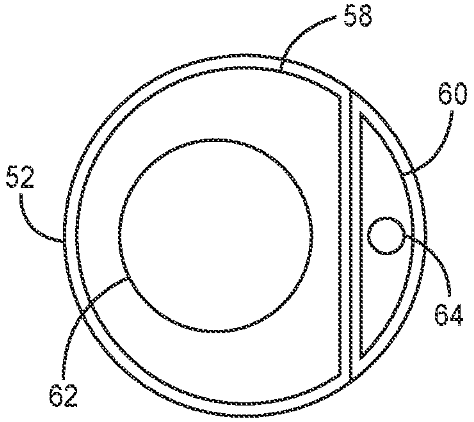
FIG. 6 is a cross-sectional view of the two-part applicator pen of FIG. 5 taken along section line 6-6 of FIG. 5.

FIG. 5 is an isometric view of applicator pen 50 for delivery of a post-treatment solution following application of a non-hexavalent chromium CCC. FIG. 6 is a cross-sectional view applicator pen 50 of FIG. 5 taken along the 6-6 line. FIGS. 5 and 6 are discussed together. Outer vessel 52, mixing vessel 54, applicator tip 56, fluid vessels 58 and 60, valves 62 and 64, and plunger 66 are shown.

Applicator pen 50 is a two-part applicator pen substantially similar to applicator pen 10 with the exception that valves 62 and 64 are actuated by pressing plunger 66 as opposed to squeezing outer vessel 12 and fluid vessels 18 and 20. Outer vessel 52 can be configured to receive separate fluid vessels 58 and 60. For example, as discussed further herein, fluid vessels 58 and 60 can be separate fluid cartridges configured to be inserted into outer vessel 52. Alternatively, outer vessel 52 can define an outer wall of fluid vessels 58 and 60, such that outer vessel 52 and fluid vessels 58 and 60 are replaceable as a single unit. Outer vessel 52 can be formed of a rigid material configured to receive plunger 66 during application.

Fluid vessels 58 and 60 contain the same materials as fluid vessels 18 and 20, respectively (i.e., SOCOSURF PACS™ solution in fluid vessel 58 and hydrogen peroxide plus pH indicator and ammonium hydroxide in fluid vessel 60). Fluid vessels 58 and 60 can be substantially similar in shape and size to fluid vessels 18 and 20 or 38 and 40 of applicator pens 10 and 30, respectively, however, may be formed of a more rigid material to maintain their shape during actuation of plunger 66. Cross-sectional areas of fluid vessels 58 and 60 are sized to provide the proper mixing ratio of the SOCOSURF PACS™ solution and hydrogen peroxide (i.e., volume ratio of the SOCOSURF PACS™ solution to hydrogen peroxide can approximately 13 or up to approximately 16, and specifically, around 93:7 to 94:6). Fluid vessels 58 and 60 have valves 62 and 64, respectively, at an end adjacent to mixing vessel 54. An opposite end of each of fluid vessel 58 and fluid vessel 60 can have a moveable seal as known in the art configured to move with plunger 66 to empty contents of fluid vessels 58 and 60 though valves 62 and 64. Valves 62 and 64 are one-way valves. Valves 62 and 64 can be substantially similar to valves 22 and 24 of applicator pen 10. The mixing ratio of the contents of fluid vessels 58 and 60 is determined by the cross-sectional area of each of fluid vessels 58 and 60. As such, it is not necessary that valves 62 and 64 have a geometry designed to provide the proper mixing ratio of the contents of fluid vessels 58 and 60 as provided with applicator pen 10. As illustrated in FIG. 6, valve 62 can have a larger cross-sectional opening than valve 64, which may increase ease of operation of plunger 66. In other embodiments, valves 62 and 64 can have the same geometry (e.g., cross-sectional opening).

Mixing vessel 54 and applicator tip 56 can be substantially the same as mixing vessel 14 and applicator tip 16 of applicator pen 10. Mixing vessel 54 can be connected to outer vessel 52, for example, by a threaded and sealed connection.

Plunger 66 can be actuated by a trigger mechanism as known in the art. During application, a user can press plunger 66 (e.g., via trigger mechanism) into outer container 52 and fluid vessels 58 and 60 to force the contents of fluid vessels 58 and 60 into mixing vessel 54. The pH indicator is visible through mixing vessel 54, which allows the user to determine if the mixture has the proper chemical composition for application or if one or both fluid vessels 58 and 60 need to be replaced.

Applicator pen 50 can be reused for multiple applications over an extended period of time. Valves 62 and 64 can prevent contamination of fluid vessels 58 and 60, respectively, such that unused portions of fluid vessels 58 and 60 can be stored for later use. Mixing vessel 54 and applicator tip 56 can be replaced or cleaned and reused for later applications. One or more fluid vessels 58 and 60 can be replaced at any time independent of the accompanying fluid vessel 58 and 60. Applicator pen 50 can be sized for handheld use (e.g., diameter of approximately 20 mm or less for ease of use).

Figure 8:
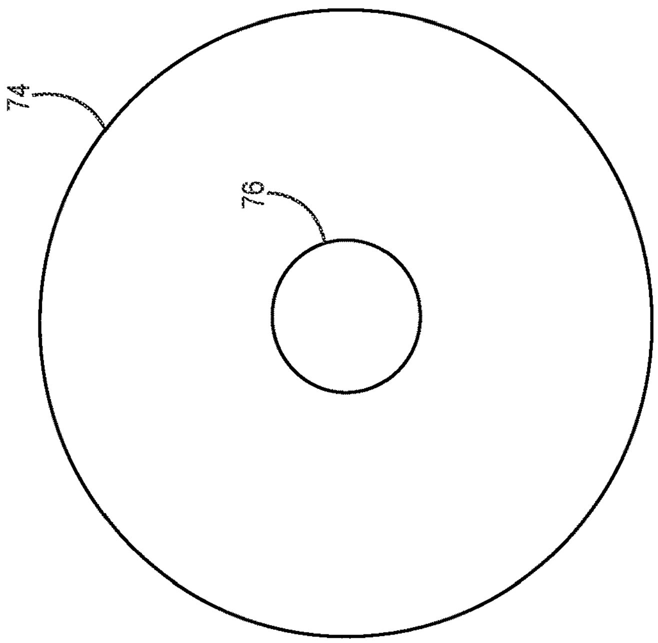
FIG. 8 is a cross-sectional view of the two-part applicator pen of FIG. 7 taken along section line 8-8 of FIG. 7.
Figure 11:
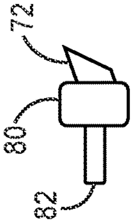
FIG. 11 is an isometric view of an applicator tip for use with the applicator pen of FIG. 10.
Figure 7:
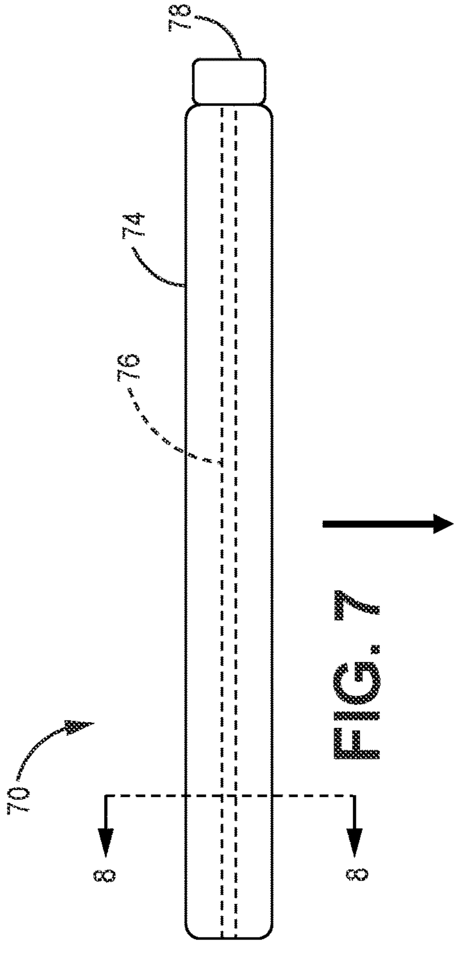
FIG. 7 is an isometric view of yet another example of a two-part applicator pen for delivery of a post-treatment solution following application of a non-hexavalent chromium chemical conversion coating (CCC).
Figure 9:
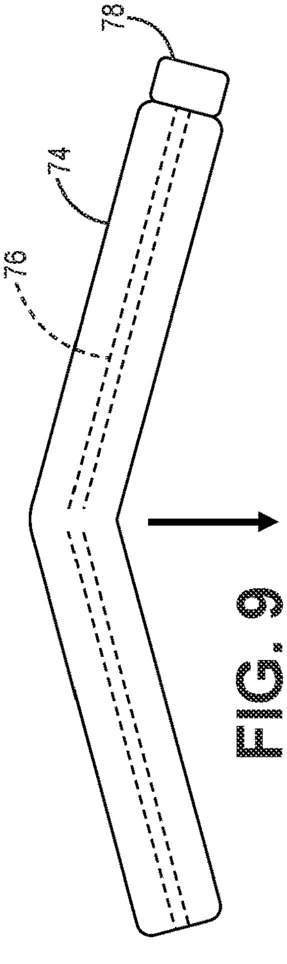
FIG. 9 is an isometric view of activation of the two-part applicator pen of FIG. 7.
Figure 10:
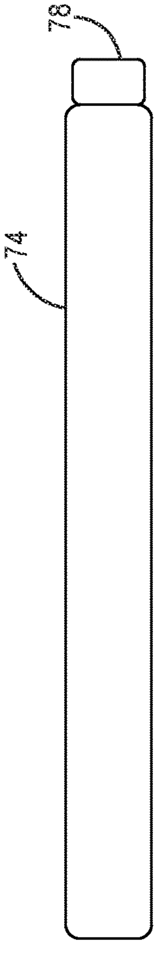
FIG. 10 is an isometric view of the two-part applicator pen of FIG. 7 with mixed components.

FIG. 7 is an isometric view of applicator pen 70 for delivery of a post-treatment solution following application of a non-hexavalent chromium CCC. FIG. 8 is a cross-sectional view of applicator pen 70 of FIG. 7 taken along the 8-8 line. FIG. 9 is an isometric view of activation of applicator pen 70 of FIG. 7. FIG. 10 is an isometric view of applicator pen 70 of FIG. 7 with mixed components. FIG. 11 is an isometric view of applicator tip 72 for use with applicator pen 70 of FIG. 10. FIGS. 7-11 are discussed together. Applicator tip 72, outer fluid vessel 74, inner fluid vessel 76, caps 78 and 80, and porous member 82 are shown.

Applicator pen 70 is two-component single-use applicator pen configured to separately store hydrogen peroxide inside a vessel containing the SOCOSURF PACS™ solution until ready for use. Outer fluid vessel 74 extends longitudinally between oppositely disposed ends. Outer vessel 74 has an opening at one end and closed at the opposite end. Inner fluid vessel 76 extends longitudinally between oppositely disposed ends. Inner fluid vessel 76 is closed at both ends. Inner fluid vessel 76 is disposed within outer fluid vessel 74. Cap 78 is disposed at the opening end of outer fluid vessel 74 and is configured to seal the opening end of outer fluid vessel 74.

Outer fluid vessel 74 contains the SOCOSURF PACS™ solution. Outer fluid vessel 74 is formed of a flexible or rigid material capable of bending to break inner fluid vessel 76. Outer fluid vessel 74 can have a rigidity that allows outer fluid vessel 74 to return to its original shape following bending. Outer fluid vessel 74 is configured to flexibly bend to break inner fluid vessel 76 without rupturing outer fluid vessel 74. Outer fluid vessel 74 defines a mixing region for the contents of outer fluid vessels 74 and inner fluid vessel 76 upon actuation of applicator pen 70. Outer fluid vessel 74 is formed of a material that allows a user to visually identify a color of the mixture of the contents of outer fluid vessel 74 and inner fluid vessel 76. For example, outer fluid vessel 74 can be a translucent plastic material, clear PVC, or clear PVDC. Outer fluid vessel 74 is not intended to provide long-term storage of the mixture of fluids and, therefore, does not need to provide long-term chemical stability of the mixture. However, outer fluid vessel 74 is formed of a material that is chemical compatible with SOCOSURF PACS™ solution and capable of providing a desired shelf life of the SOCOSURF PACS™ solution. Outer fluid vessel 74 can be cylindrical with a circular cross-section. Cap 78 can be received on outer fluid vessel 74 by a threaded connection.

Inner fluid vessel is disposed inside outer fluid vessel 74. Inner fluid vessel 76 can extend a full length of outer fluid vessel 74. Inner fluid vessel 76 can be joined to outer fluid vessel 74 to maintain position within outer fluid vessel 76 prior to actuation of applicator pen 70. Inner fluid vessel 74 can be centrally located within outer fluid vessel 74. Inner fluid vessel 76 contains hydrogen peroxide and a pH indicator as described with respect to applicator pen 10. Inner fluid vessel 76 can additionally include ammonium hydroxide to set the pH. Inner fluid vessel 76 is formed of a material capable of breaking or shattering when deformed to release the contents of inner fluid vessel 76. For example, inner fluid vessel 76 can be a thin glass.

A protective and removable sheath (not shown) can be provided to outer fluid vessel 74 to limit an amount of light that reaches inner fluid vessel 76 to prolong the shelf life of the hydrogen peroxide contained in inner vessel 76. The user can determine if applicator pen 70 has exceeded a shelf life or has been improperly stored by viewing the color of the mixture of the SOCOSURF PACS™ solution and hydrogen peroxide with pH indicator. The color of the mixture can be used to determine if the pH of the mixture is within the acceptable range of 4.2 to 5.3. If the pH is outside of the acceptable range, applicator pen 70 can be properly disposed and a new applicator pen can be actuated for use.

Outer fluid vessels 74 and inner fluid vessel 76 are sized to provide a proper mixing ratio of the SOCOSURF PACS™ solution to hydrogen peroxide as previously discussed with respect to applicator pens 10, 30, and 50. For example, diameters of outer fluid vessel 74 and inner fluid vessel 76 can be sized to provide a volume ratio of the SOCOSURF PACS™ solution to hydrogen peroxide of about 13 or up to about 16 or, more specifically, a volume ratio of 93:7 to 94:6, as illustrated in FIG. 8. Applicator pen 70 can be designed in multiple sizes for use in applications requiring more or less coverage of the post-treatment solution. As such, a user can select the appropriate size applicator pen 70 necessary to complete their specific task. For example, the diameters of outer fluid vessel 74 and inner fluid vessel 76 or the lengths of outer fluid vessel 74 and inner fluid vessel 76 can be increased or decreased to accommodate larger or smaller volumes, respectively. Generally, the size of applicator pen 70 is limited to what is feasible for handheld application of the post-treatment solution (e.g., diameter of approximately 20 mm or less for ease of use).

Applicator pen 70 can be stored for an extended period of time (e.g., up to one year) prior to actuation (FIG. 7) at room temperature. When a user is ready to apply the post-treatment solution, outer fluid vessel 74 is bent to break or shatter inner fluid vessel 76 as illustrated in FIG. 9. The contents of inner fluid vessel 74 are released into outer fluid vessel 74, which defines a mixing region for the contents of both outer fluid vessel 74 and inner fluid vessel 76. Gentle shaking or rocking may be provided by the user to mix the contents of outer fluid vessel 74 and inner fluid vessel 76.

FIG. 10 illustrates the mixed contents of outer fluid vessel 74 and inner fluid vessel 76 contained within outer fluid vessel 74. Portions of broken inner fluid vessel 76 have been removed for clarity. As illustrated, outer fluid vessel 74 has returned to its original shape. Prior to application, cap 78 can be removed and replaced with cap 80 including applicator tip 72, illustrated in FIG. 10. Applicator tip 72 can be substantially the same as applicator tip 16 of applicator pen 10. Cap 80 can be configured for threaded engagement with outer fluid vessel 74. Porous member 82 can extend from applicator tip 72 through cap 80 and into outer fluid vessel 74 to promote transfer of the mixture to applicator tip 72. Applicator pen 70 is designed for one-time use but may be used for multiple applications over a short period of time during which the mixture is stable, as determined by visual inspection of the color of the solution. Generally, use of applicator pen 70 can continue as long as the solution remains within the acceptable pH range.

Each of the disclosed applicator pens 10, 30, 50, and 70 are configured to separately store SOCOSURF PACS™ solution and hydrogen peroxide and provide controlled mixing of the two chemical components at proper ratios when ready for use. Applicator pens 10, 30, and 50 include separate fluid vessels of the SOCOSURF PACS™ solution and hydrogen peroxide, which can be independently replaced, if necessary, as indicated by a pH of the mixture, which is visible through a mixing vessel of the applicator pen. Applicator pen 70 is configured for one-time use but can be made available in a variety of sizes to accommodate single applications of varying sizes (e.g., small coverage vs. large coverage needs).

Any relative terms or terms of degree used herein, such as “substantially”, “essentially”, “generally”, “approximately” and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A handheld applicator for delivery of post-treatment coating following application of a conversion coating includes a first vessel extending longitudinally and containing SOCOSURF PACS™ solution, a second vessel extending longitudinally and containing hydrogen peroxide, a pH indicator contained in one of the first or second vessels, a mixing region configured to combine the SOCOSURF PACS™ solution, hydrogen peroxide, and pH indicator.

The handheld applicator of the preceding paragraph can optionally include, additionally and/or alternatively, any one or more of the following features, configurations and/or additional components:

The handheld applicator of the preceding paragraph, wherein the pH indicator is contained in the second vessel.

The handheld applicator of any of the preceding paragraphs can further include a third vessel extending longitudinally, a fourth vessel connected to the third vessel, and applicator tip. The first vessel and the second vessel are received in the third vessel in a side-by-side orientation. The fourth vessel defines the mixing region. The applicator tip is in fluid communication with the mixing region and configured to deliver a mixture of the SOCOSURF PACS™ solution, hydrogen peroxide, and pH indicator.

The handheld applicator of any of the preceding paragraphs, wherein the pH indicator is visible through the fourth vessel.

The handheld applicator of any of the preceding paragraphs, wherein the first vessel includes a first one-way valve and the second vessel includes a second one-way valve, the first and second one-way valves disposed to transfer contents of the first and second vessels to the mixing region.

The handheld applicator of any of the preceding paragraphs, wherein the first one-way valve has an opening diameter greater than an opening diameter of the second one-way valve.

The handheld applicator of any of the preceding paragraphs, wherein the first, second, and third vessels are formed of a flexible material capable of being squeezed to exert a force on contents of the first and second vessels to actuate the first and second one-way valves.

The handheld applicator of any of the preceding paragraphs, wherein the second vessel is disposed in the first vessel and wherein the second vessel comprises a material configured to break to release the hydrogen peroxide and pH indicator into the first vessel, and wherein the first vessel comprises a flexible material configured to flexibly bend so as to break the second vessel without rupturing the first vessel.

The handheld applicator of any of the preceding paragraphs, and further comprising an end including a removable cap, the end configured to receive an applicator tip for delivering a mixture of the SOCOSURF PACS™ solution, hydrogen peroxide, and pH indicator.

The handheld applicator of any of the preceding paragraphs, wherein the mixing region is defined by the second vessel and wherein the pH indicator is visible through the second vessel.

The handheld applicator of any of the preceding paragraphs, wherein the first vessel has a cross-sectional area greater than a cross-sectional area of the second vessel.

The handheld applicator of any of the preceding paragraphs, wherein the first vessel includes a first one-way valve and the second vessel includes a second one-way valve, the first and second one-way valves disposed to transfer contents of the first and second vessels to the mixing region.

The handheld applicator of any of the preceding paragraphs can further include a fourth vessel connected to the first and second vessels, an applicator tip, and a plunger. The fourth vessel defines the mixing region. The applicator tip is in fluid communication with the mixing region and configured to deliver a mixture of the SOCOSURF PACS™ solution, hydrogen peroxide, and pH indicator. The plunger is configured to exert a force on the contents of the first and second vessels to actuate the first and second one-way valves and deliver the contents of the first and second vessels to the fourth vessel.

The handheld applicator of any of the preceding paragraphs, wherein the pH indicator is visible through the fourth vessel.

The handheld applicator of any of the preceding paragraphs, wherein a volume ratio of SOCOSURF PACS™ solution to hydrogen peroxide is greater than 13.

The handheld applicator of any of the preceding paragraphs, wherein the pH indicator provides a visible color indicating a pH equal to or greater than 4.2 and equal to or less than 5.3.

The handheld applicator of any of the preceding paragraphs, wherein the pH indicator provides a visible color indicating a pH less than 4.2 or greater than 5.3.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A handheld applicator for delivery of post-treatment coating following application of a conversion coating, the handheld applicator comprising:

a first vessel extending longitudinally and containing a lanthanum (III) salt solution;

a second vessel extending longitudinally and containing hydrogen peroxide;

a pH indicator contained in one of the first or second vessels; and a mixing region configured to combine the lanthanum (III) salt solution, hydrogen peroxide, and pH indicator.

2. The handheld applicator of claim 1, wherein the pH indicator is contained in the second vessel.

3. The handheld applicator of claim 2, wherein the second vessel is disposed in the first vessel and wherein the second vessel comprises a material configured to break to release the hydrogen peroxide and pH indicator into the first vessel, and wherein the first vessel comprises a flexible material configured to flexibly bend so as to break the second vessel without rupturing the first vessel.

4. The handheld applicator of claim 3, and further comprising an end including a removable cap, the end configured to receive an applicator tip for delivering a mixture of the lanthanum (III) salt solution, hydrogen peroxide, and pH indicator.

5. The handheld applicator of claim 4, wherein the mixing region is defined by the second vessel and wherein the pH indicator is visible through the second vessel.

6. The handheld applicator of claim 1, and further comprising:

a third vessel extending longitudinally, wherein the first vessel and the second vessel are received in the third vessel in a side-by-side orientation;

a fourth vessel connected to the third vessel, the fourth vessel defining the mixing region; and an applicator tip in fluid communication with the mixing region and configured to deliver a mixture of the lanthanum (III) salt solution, hydrogen peroxide, and pH indicator.

7. The handheld applicator of claim 6, wherein the pH indicator is visible through the fourth vessel.

8. The handheld applicator of claim 7, wherein the first vessel includes a first one-way valve and the second vessel includes a second one-way valve, the first and second one-way valves disposed to transfer contents of the first and second vessels to the mixing region.

9. The handheld applicator of claim 8, wherein the first one-way valve has an opening diameter greater than an opening diameter of the second one-way valve.

10. The handheld applicator of claim 9, wherein the first, second, and third vessels are formed of a flexible material capable of being squeezed to exert a force on contents of the first and second vessels to actuate the first and second one-way valves.

11. The handheld applicator of claim 1, wherein the first vessel has a cross-sectional area greater than a cross-sectional area of the second vessel.

12. The handheld applicator of claim 11, wherein the first vessel includes a first one-way valve and the second vessel includes a second one-way valve, the first and second one-way valves disposed to transfer contents of the first and second vessels to the mixing region.

13. The handheld applicator of claim 12, and further comprising:

a third vessel connected to the first and second vessels, the third vessel defining the mixing region;

an applicator tip in fluid communication with the mixing region and configured to deliver a mixture of the lanthanum(III) salt solution, hydrogen peroxide, and pH indicator; and a plunger configured to exert a force on the contents of the first and second vessels to actuate the first and second one-way valves and deliver the contents of the first and second vessels to the fourth vessel.

14. The handheld applicator of claim 13, wherein the pH indicator is visible through the third vessel.

15. The handheld applicator of claim 1, wherein a volume ratio of lanthanum (III) salt solution to hydrogen peroxide is greater than 13.

16. The handheld applicator of claim 1, wherein the pH indicator provides a visible color indicating a pH equal to or greater than 4.2 and equal to or less than 5.3.

17. The handheld applicator of claim 1, wherein the pH indicator provides a visible color indicating a pH less than 4.2 or greater than 5.3.

* * * * *